United States Patent [19]

Inou et al.

[11] Patent Number: 4,862,339
[45] Date of Patent: Aug. 29, 1989

[54] DC POWER SUPPLY WITH IMPROVED OUTPUT STABILIZING FEEDBACK

[75] Inventors: Kiyoharu Inou; Katsuji Sakimoto, both of Tokyo, Japan

[73] Assignee: Yokogawa Electric Corporation, Tokyo, Japan

[21] Appl. No.: 175,924

[22] Filed: Mar. 31, 1988

[30] Foreign Application Priority Data

Jun. 5, 1987 [JP] Japan ............... 62-87396[U]
Jun. 24, 1987 [JP] Japan ............... 62-96709[U]
Jun. 24, 1987 [JP] Japan ............... 62-96710[U]
Oct. 2, 1987 [JP] Japan ............... 62-151455[U]
Oct. 21, 1987 [JP] Japan ............... 62-161170[U]

[51] Int. Cl.$^4$ ........................................ H02M 3/335
[52] U.S. Cl. ................................ 363/21; 363/80; 363/97
[58] Field of Search ............... 363/21, 79, 80, 95, 363/97

[56] References Cited

U.S. PATENT DOCUMENTS

| | | | |
|---|---|---|---|
| 3,924,172 | 12/1975 | Gregorich | 363/21 |
| 4,063,307 | 12/1977 | Stephens | 363/21 |
| 4,128,867 | 12/1978 | Heyman | 363/21 |
| 4,215,392 | 7/1980 | Rhoads | 363/49 |
| 4,253,136 | 2/1981 | Nanko | 363/21 |
| 4,323,961 | 4/1982 | Josephson | 363/80 |
| 4,439,821 | 3/1984 | Grippe | 363/97 |
| 4,453,206 | 6/1984 | Voight | 363/21 |
| 4,495,554 | 1/1984 | Simi et al. | 363/97 |
| 4,499,530 | 2/1985 | Onda et al. | 363/21 |
| 4,541,039 | 9/1985 | Sandler | 363/21 |
| 4,605,039 | 8/1987 | Inou et al. | 363/16 |
| 4,608,625 | 8/1986 | Josephson et al. | 363/80 |
| 4,680,688 | 7/1987 | Inou et al. | 363/21 |
| 4,683,528 | 7/1987 | Snow et al. | 363/97 |
| 4,706,176 | 11/1987 | Kettschau | 363/21 |
| 4,787,020 | 11/1988 | Hiramatsu et al. | 363/21 |
| 4,791,546 | 12/1988 | Carroll | 363/21 |

Primary Examiner—Patrick R. Salce
Assistant Examiner—Jeffrey Sterrett
Attorney, Agent, or Firm—Moonray Kojima

[57] ABSTRACT

A switching type DC/DC converter wherein a switching control circuit is disposed at the primary winding thereof, and a detection signal, in a secondary winding, is insulated by a transformer and fed back to stabilize output voltages. Current consumption is reduced by using a transformer to act as an insulator, and the size of a stabilizing feedback circuit is reduced by using resistors and diodes so that the rate of production thereof is improved. A switching signal in a secondary winding of a main transformer is used as an excitation energy for an insulating transformer of the stabilizing feedback circuit, the excitation energy being supplied through an impedance device. The output voltage supplied to a load is supplied as a stabilizing signal to a primary winding of an insulating transformer by means of the stabilizing feedback circuit. In a secondary winding of the insulating transformer, the excitation energy is used to supply a pure stabilizing signal to the control circuit to stabili e the output voltage. The stabilizing signal is defined as an error signal obtained by comparing the output voltage with a predetermined reference voltage in the primary or secondary winding of the insulating transformer.

19 Claims, 11 Drawing Sheets

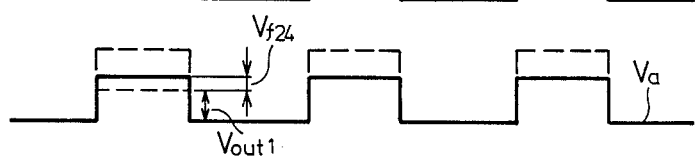
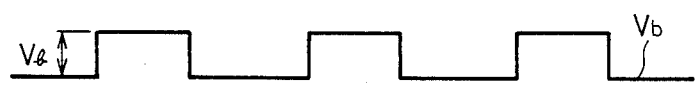
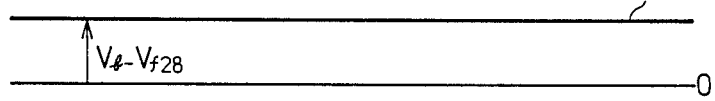
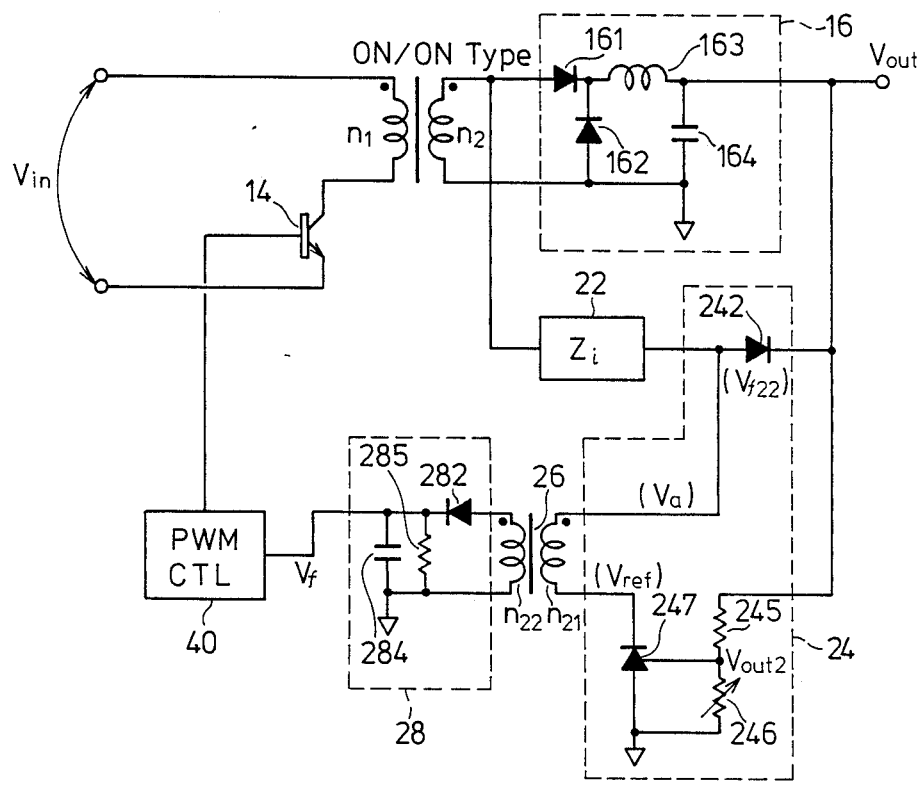

Fig. 6
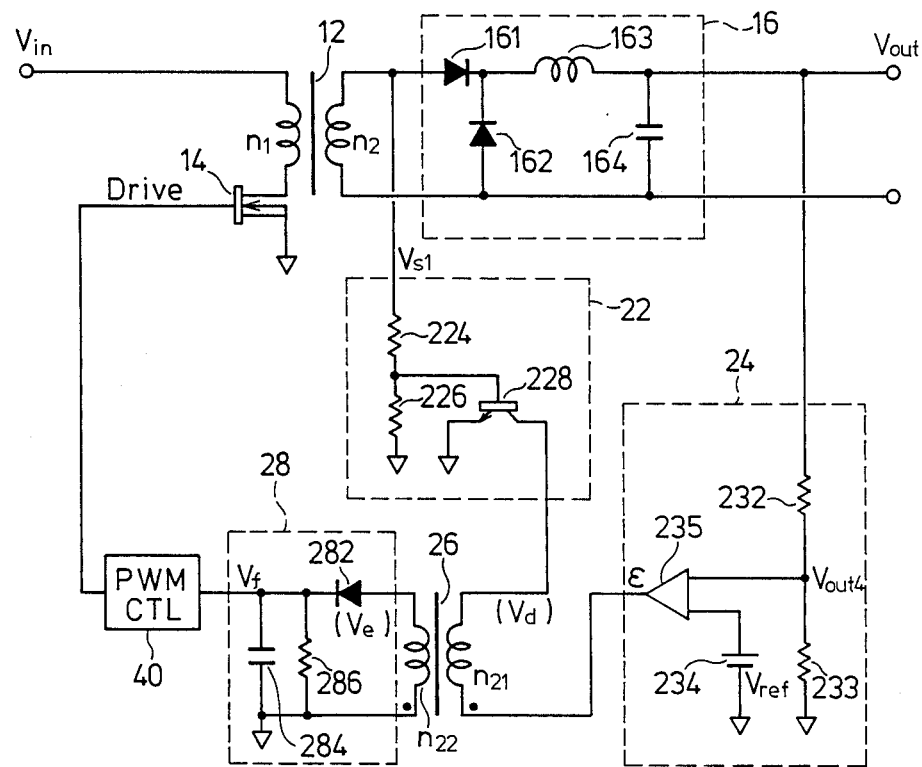
Fig. 7(a) $V_{s1}$
Fig. 7(b) $V_d$
Fig. 7(c) $V_e$

Fig. 8
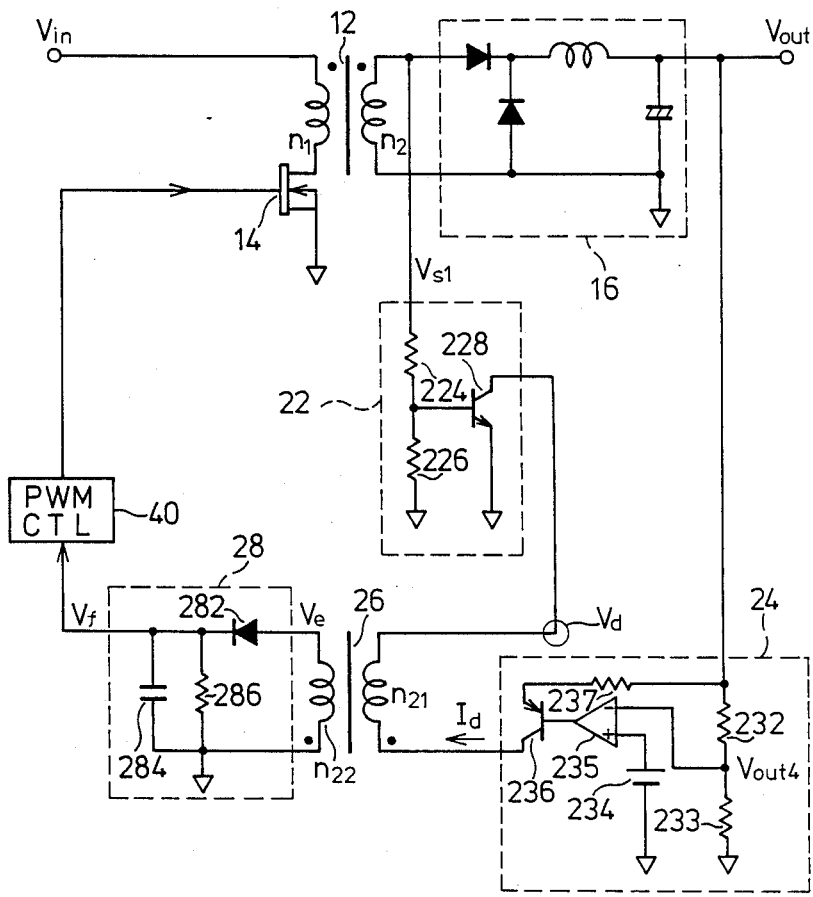
Fig. 9(a) $V_{s1}$ 
Fig. 9(b) $V_d$ 
Fig. 9(c) $I_d$ 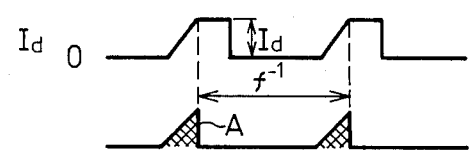

Fig. 9(e) $V_e$ $V_{s1}$ $V_a$ $V_b$ $V_g$

DC POWER SUPPLY WITH IMPROVED OUTPUT STABILIZING FEEDBACK

BACKGROUND OF THE INVENTION

1. Field of Invention

This invention relates to a DC power supply for feeding back a signal which stabilizes an output by using a transformer to insulate a stabilizing signal. More particularly, this invention relates to a DC/DC converter in which the excitation energy of an insulating transformer is obtained from a switching output in a secondary winding of a main transformer. The excitation energy is supplied as a stabilizing signal that is related to the output voltage to a primary coil of the insulating transformer. The stabilizing signal is used for activating a switching control circuit after the excitation energy has been removed by a secondary winding of the insulating transformer.

Furthermore, this invention relates to a DC/DC converter which is provided with means for protecting a power supply by detecting defects such as an overvoltage, overcurrent, or low voltage in a load, and for supplying detected information to a switching control circuit.

2. Discussion of the Prior Art.

U.S. Pat. No. 4,680,688 discloses a multi-output regulated power supply that mainly stabilizes a plurality of output voltages by use of a single feedback path. U.S. Pat. No. 4,685,039 discloses a device for obtaining large output and capacity, wherein the primary winding is so constituted that two one-transistor type ON/ON type converters are connected in series and diodes are connected in a crossing manner, while the secondary winding is so constituted that the two one-transistor type ON/ON converters are connected in parallel.

A device of the latter type has been developed for use as a power supply for a system. It is able to supply a variety of voltages, such as 5, 12, and 28 volts, by means of a single power supply, and is characterized in that the required level of power supply is provided although the volume of the device is small. It is preferable that the power supply for the system satisfies various safety standards, such as required by Underwriters Laboratory standards. Thus, it is necessary for the primary winding and the secondary winding to be completely insulated from each other, which necessitates application without exception of a feedback circuit for stabilizing output.

A power supply which is intended to satisfy such safety standards is exemplified in U.S. Pat. No. 4,215,392 which discloses an inverter power supply which is characterized in that the main path thereof is insulated by a main transformer, and a feedback circuit for stabilization is insulated by a photocoupler. However, the use of the photocoupler causes the following problems.

1. In order to meet safety standards, a certain distance is needed between the primary winding and the secondary winding, which deteriorates the converting ratio (CTR), so that the size of the device becomes large.

2. Since differences in CTR between individual devices, changes caused by temperature, and deterioration caused by time and radiation are too large, the device must be designed to include large tolerances.

3. If a high switching frequency is inputted as it is, response cannot follow the high switching frequency.

Therefore, it has been considered that an insulating transformer could be provided for the feedback circuit. However, if this design is used, the output voltage changes in a similar manner to that of the DC voltage, so that excitation energy must be independently supplied. In that case, a transformed for excitation energy must be provided, causing the structure to become complex, costs to become high, and the size of the device to become large.

Furthermore, it is preferable that the power supply for the system be extremely reliable so that maintenance intervals are lengthened. Thus, if it is considered likely that a defect (for example, a short circuit or a misconnection with another power supply) will occur in the load because of an overvoltage, overcurrent or low voltage, countermeasures for protecting the power supply from damage, must be undertaken.

SUMMARY OF THE INVENTION

Accordingly, an object of the invention is to overcome the aforementioned and other deficiencies and disadvantages of the prior art.

A first object is to provide a stabilized feedback circuit of a simple structure without having to use an independent power supply. A second object is to provide a device wherein excitation energy supplied to a secondary winding is removed from a primary winding of an insulating transformer so that a correct output-stabilizing signal which does not depend upon the input voltage can be obtained. A third object is to provide a device wherein, when an overvoltage, overcurrent or low voltage is detected in a load, a protection signal is supplied to a switching circuit so as to protect the device from damage.

The first object is attained by the invention which comprises the following DC power supply described below, an output voltage stabilizing portion, and means for controlling switching.

The DC power supply comprises a main transformer in which DC current is supplied to a primary winding, a switching element which turns ON and OFF the direct current in the primary winding of the main transformer, and a rectifying and smoothing circuit for rectifying and smoothing a switching signal generated in a secondary winding of the main transformer, to supply the switching signal to a load after it has been rectified and smoothed.

The output voltage stabilizing portion comprises means for supplying excitation energy which inputs the switching signal of the secondary winding of the main transformer as excitation energy, means for supplying a stabilizing signal for generating a stabilizing signal which is related to the output voltage of the rectifying and smoothing circuit, a first insulating transformer which inputs the stabilizing signal outputted by the stabilizing signal outputting means to a primary winding thereof and outputs the stabilizing signal by excitation energy supplied by the excitation energy supplying means, and means for extracting the stabilizing signal by removing the excitation energy from a signal generated in a secondary winding of the insulating transformer, the stabilizing signal being a signal representing an error obtained by comparing the level of the output voltage at the primary winding or the secondary winding of the insulating transformer with the level of the predetermined reference voltage.

The switching control means stabilizes the output voltage by adjusting an ON/OFF control signal which is supplied to the switching element.

To attain the first and third objects, a protection signal supplying portion is further provided in addition to the DC power supply and the output voltage stabilizing portion. The protection signal supplying portion comprises means for detecting a defect in a load, such as an overvoltage, overcurrent or low voltage generated in a load portion; means for supplying excitation energy which inputs the switching signal from the secondary winding of the main transformer as excitation energy; means for supplying a protection signal which inputs a protection signal output by the defect detecting means; a second insulating transformer which inputs the protection signal outputted by the protection signal supplying means to a primary winding thereof and which outputs the protection signal using excitation energy supplied by the excitation energy supplying means; and means for extracting the protection signal from a signal generated in a secondary winding of the second insulating transformer.

The switching control means stabilizes the output voltage by adjusting the ON/OFF control signal which is supplied to the switching element, in response to the stabilizing signal, and stops the supply of ON/OFF control signal in response to the protection signals.

BRIEF DESCRIPTION OF THE DRAWINGS

FIGS. 3(A)-3(D) are wave charts depicting waves of the output voltage stabilizing portion 20 of the embodiment of FIG. 2.

FIG. 4 is a circuit diagram depicting a second illustrative embodiment of the invention.

FIG. 6 is a circuit diagram depicting a fourth illustrative embodiment of the invention.

FIGS. 7(A)-7(C) are waveform charts depicting waves of the embodiment of FIG. 6.

FIG. 8 is a circuit diagram depicting a fifth illustrative embodiment of the invention.

FIGS. 9(A)-9(E) are waveform charts depicting waves of the embodiment of FIG. 8.

DETAILED DESCRIPTION OF PREFERRED EMBODIMENTS

In the following description similar parts are designated with similar notations and repeated description of similar parts will be omitted for clarity of description.

Figure 1:
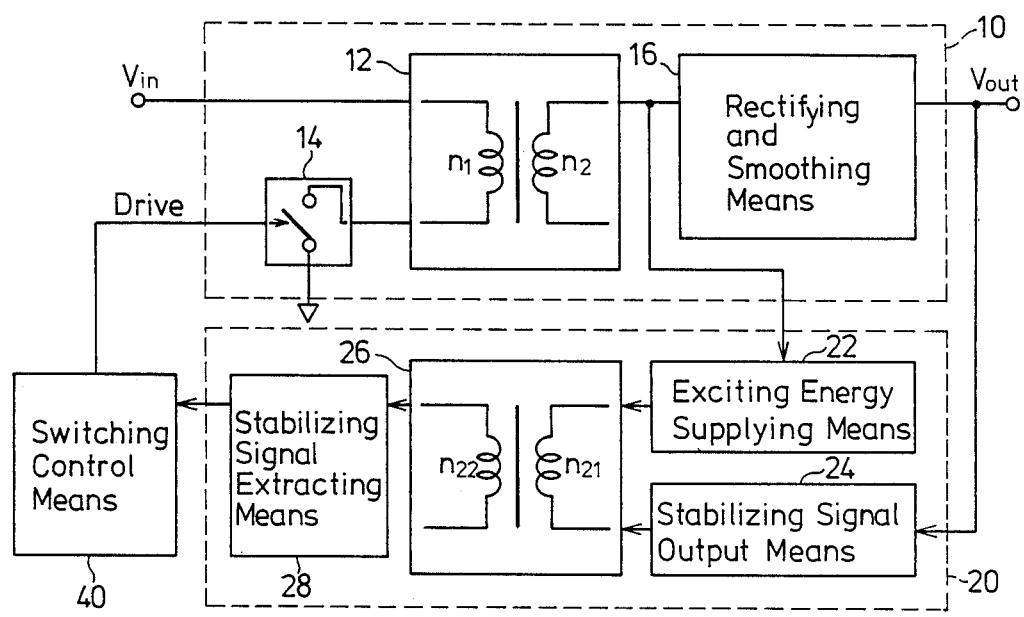
FIG. 1 is a block diagram depicting the principles of the invention.

Turning to FIG. 1, the embodiment comprises a DC power supply 10, an output voltage stabilizing portion 20 and a switching controlling means 40.

DC power supply 10 comprises a main transformer 12 which receives as an input to a primary winding thereof, a DC voltage Vin that has been obtained by rectifying and smoothing, for example, a commercial AC power supply; a switching element 14, such as a transistor or FET, which turns ON and OFF a DC current in primary winding n1 of main transformer 12; and a rectifying and smoothing circuit 16 which rectifies and smooths a switching signal generated in a secondary winding n2 of main transformer 12 and supplies the switching signal as a DC voltage Vout to a load.

The DC power supply 10 may be a full bridge or half bridge ON/ON converter, wherein the switching waveform at the primary side is of the same phase as that of the secondary side, or ON/OFF converter, wherein the switching waveform at the primary side and that at the secondary side are of complementary phases.

Output stabilizing portion 20 comprises excitation energy supplying means 22 which has inputted thereto a switching signal Vs1, form secondary winding n2 of main transformer 12, as excitation energy; stabilizing signal supplying means 24 which generates a stabilizing signal related to the output voltage Vout from the rectifying and smoothing circuit 16; a first insulating transformer 26 which has inputted thereto the stabilizing signal outputted by stabilizing signal supplying means 24 to a primary winding n21 thereof, and which outputs a stabilizing signal using excitation energy supplied by excitating energy supplying means 22; and stabilizing signal extracting means 28 which extracts a stabilizing signal Vf from a signal generated in a secondary winding n22 of insulating transformer 26, the stabilizing signal Vf being a signal representing an error obtained by comparing the output voltage Vout with a predetermined reference voltage Vref in primary winding n21 of insulating transformer 26 or its secondary winding n22.

Furthermore, switching control means 40 is provided to adjust, in response to stabilizing signal Vf, an ON/OFF control signal which is supplied to switching element 14, to stabilize the output voltage. The ON/OFF control signal may be adjusted by adjusting the frequency at which the signal is turned ON and OFF. A pulse transformer, which has a good response performance with respect to the switching frequency output by switching control means 40, is preferably used for insulating transformer 26.

The operation of the FIG. 1 device is as follows. DC power supply 10 receives as an input a DC voltage Vin and converts it to a DC voltage Vout of a required level. Although only a single secondary winding is shown, a plurality of secondary windings may be provided, if desired. Output voltage stabilizing portion 20 obtains stabilizing signal Vf by inputting and comparing the output voltage Vout with reference voltage Vref so as to retain the level of the output voltage Vout constant regardless of the load.

In the below first, second and third illustrative embodiments, the stabilizing signal Vf is obtained by comparing the output voltage Vout with the reference voltage Vref in the primary winding n21.

First Illustrative Embodiment

Figure 2:
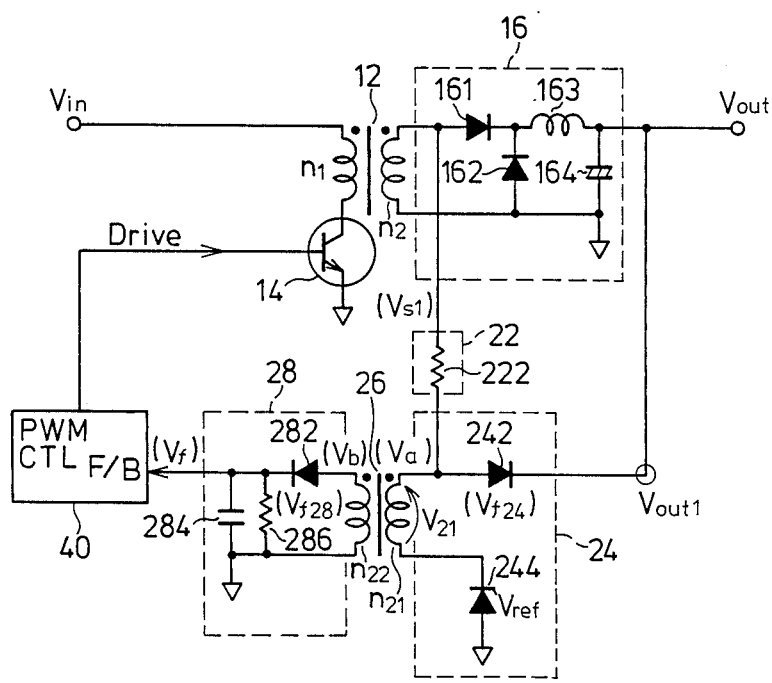
FIG. 2 is a circuit diagram depicting a first illustrative embodiment of the invention.

FIG. 2 depicts an embodiment a rectifying and smoothing circuit comprising diodes 161 and 162 which rectify the switching signal generated in secondary winding n2 of transformer 12; a capacitor 164 for accumulating and smoothing the smoothed signal; and a choke winding 163 which removes the pulse components of the signals outputted by diodes 161 and 162 to prevent capacitor 164 from receiving excessive voltage.

Excitation energy supplying means 22, comprising impedance 222, introduces switching signal Vs1 which is generated in secondary winding n2 of transformer 12 as an excitation energy. The resistance of resistor 222 is preferably greater than the output impedance of DC power supply 10. Excitation energy supplying means 22 may be connected to the cathode side of diode 161 of rectifying and smoothing circuit 16, or it may be connected to the anode side of diode 161. It is needed to obtain a signal related to switching signal Vs1 without affecting the output voltage Vout.

Stabilizing signal supplying means 24 comprises a diode 242 having its anode connected to excitation energy supplying means 22 and its cathode connected to the output voltage Vout terminal. Stabilizing signal supplying means 24 further comprises a constant voltage regulated power supply 244, one end of which is connected to insulating transformer 26, and which generates reference voltage Vref. Constant voltage regulated power supply 244 may be a Zener diode having its anode side grounded and its cathode side connected to primary winding n21 of insulating transformer 26. Both the excitation energy supplying means 22 and diode 242 are connected to primary winding n21 of insulating transformer 26, and generate a voltage signal Va. Output voltage out, which is applied to diode 242, may be obtained as divided by means of a resistor or the like. It is necessary for the output voltage Vout to correspond one-to-one to the output voltage Vout which the rectifying and smoothing circuit 16 supplies to the load.

Stabilizing signal extracting means 28 comprises a diode 282 which rectifies a voltage signal Vb generated in secondary winding n22 of insulating transformer 26. Stabilizing signal extracting means 28 further comprises capacitor 284 for accumulating and smoothing the thus smoothed voltage signal Vb, and a resistor 286 for determining the time constant of capacitor 284. Signals outputted by capacitor 284 are supplied to switching control means 40 as stabilizing signals.

Switching control means 40 preferably comprises integrated circuits (ICs) for a general purpose pulse width modulation (PWM) in the case where ON/OFF width is adjusted. For example, TL494, manufactured by Texas Instruments Co., may be used for such purpose. ICs of the type described comprise a feedback terminal (F/B) which receives as an input stabilizing signal Vf, a drive terminal for outputting an ON/OFF signal to switching element 14, and a power supply terminal (omitted from drawing).

The operation of the FIG. 2 embodiment will not be described with reference to FIGS. 3(A)–3(D) which depict waveforms at the output voltage stabilizing portion 20 (comprising 22,24,26,28) of FIG. 2 and wherein FIG. 3(A) depicts the waveform of switching signal Vs1, FIG. 3(B) depicts the waveform of voltage signal Va, FIG. 3(C) depicts the waveform of voltage signal Vb, and FIG. 3(D) depicts the waveform of stabilizing signal Vf. When DC power supply 10 (comprising 12,14,16 of FIG. 2) is activated, switching signal Vs1 is generated at secondary winding n2, and is supplied as DC output voltage Vout to the load by means of rectifying and smoothing circuit 16. Switching signal Vs1 is supplied, as excitation energy, to primary winding n21 of insulating transformer 26 via excitation energy supplying means 22.

Voltage signal Va is clamped at voltage (Vout 1 +Vf24) by diode 242, the voltage being the sum of signal Vout 1( related to the output voltage Vout) and the forward bias Vf24 of diode 242. The reason why signal Vout 1 is used is because the case where the output voltage Vout is per se used and the case where the output voltage Vout is divided by a resistor are considered. One end of primary winding n21 is supplied with reference voltage Vref from constant voltage regulated power supply 244. Therefore, excitation energy V21 at primary winding n21 of transformer 26 is given by the following equation.

$$V21 = Vout\ 1 + Vf24 - Vref \tag{1}$$

That is, if the level of signal Vout 1 becomes higher than that of reference voltage Vref, the amplitude of switching voltage of voltage signal Va increases, and it becomes independent of DC voltage Vin. Thus, this characteristic contributes to the achievement of the second object of the invention.

Voltage signal Vb becomes a pulse signal of a voltage which is determined by the excitation voltage (Vout 1+Vf24−Vref) and the insulating transformer winding ratio n21/n22. This pulse signal is converted to DC by means of stabilizing signal extracting means 28 so that the pulse signal becomes a stabilizing signal Vf. The voltage of stabilizing signal Vf becomes a voltage (Vb−Vf28) which is obtained by subtracting forward voltage Vf28 of diode 282 from voltage signal Vb.

Provided that the forward bias Vf24 and Vf28 of corresponding diodes 242 and 282 are the same, and the winding ratio in transformer 26 is the same, the voltage of stabilizing signal Vf, which is applied to control means 40, is expressed as follows.

$$\begin{aligned} Vf &= Vb - Vf28 \\ &= Vout\ 1 + Vf24 - Vref - Vf28 \\ &= Vout\ 1 - Vref \end{aligned} \tag{2}$$

That is, stabilizing signal Vf becomes Vout 1 −Vref regardless of the forward bias Vf24 and Vf28 of diodes 242 and 282. In general, since the forward bias of diodes is affected by load current, stabilizing signal Vf loses its correct correspondency to output voltage Vout if Vf24 and Vf28 do not cancel out each other.

Switching control means 40 controls the turning ON and OFF of switching element 14 to thereby make stabilizing signal Vf zero. Thus, portion 20 becomes capable of correctly supplying stabilizing signal Vf related to output voltage Vout to switching control means 40 through insulating transformer 26. As a result, the output voltage can be precisely stabilized regardless of the temperature characteristics of diodes and the dispersion of the forward voltages. Consequently, the thus realized stabilization contributes to achievement of the second object of the invention.

Second and Third Illustrative Embodiments.

The embodiment of FIG. 4 differs from the FIG. 2 embodiment in that constant voltage regulated power supply 244 is replaced with other parts. Stabilizing signal supplying means 24 uses the same diode 242 as that used by excitation energy supplying means 22. However, a variable shunt regulator 247 which may be a TL431, for example, is used as the power supply 244, so that output voltage Vout is divided by resistor 245 and 246, and the divided output voltage Vout is supplied as divided voltage Vout 2. In that case, resistor 246 serves as a variable resistor so that the operating point of excitation voltage V21 of primary winding n21 can be adjusted. As a result, reference voltage Vref is adjusted to precisely stabilize the output voltage.

The operation of the FIG. 4 embodiment is as follows. Variable shunt regulator 247 adjusts the level of reference voltage Vref so as to retain the level of divided voltage Vout 2. As a result, excitation voltage V21, which is supplied to primary winding n21, is adjusted so that corresponding stabilizing signal Vf is supplied to the control means 40.

Figure 5:
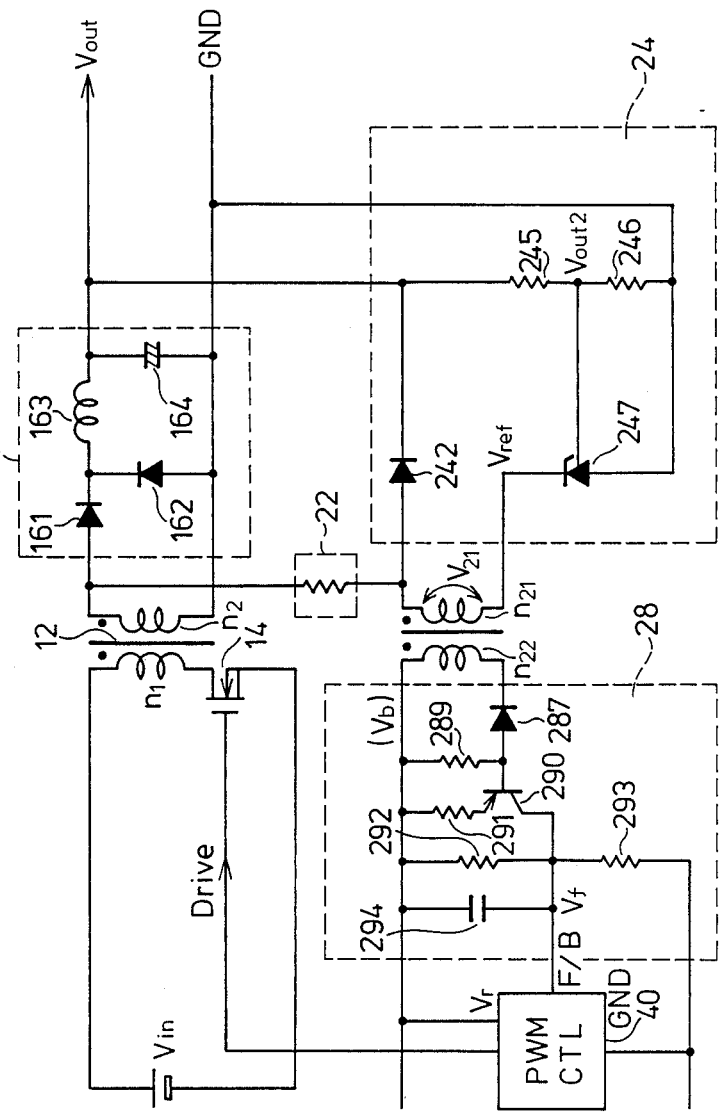
FIG. 5 is a circuit diagram depicting a third illustrative embodiment of the invention.

The embodiment of FIG. 5 differs from the FIG. 4 embodiment in that extracting means 28 of FIG. 4 is made of a constant current rectifying circuit. Control means 40 comprising IC's for PWM, has a stabilizing reference voltage terminal Vr, and stabilizing reference voltage Vr outputted by this terminal is used in the extracting means 28. In this embodiment, since the terminal Vr for the stabilizing reference voltage Vr is connected to a secondary winding n22, the structure is different from that shown in FIG. 4. The cathode side of diode 287 is connected to secondary winding n22, while the anode side of diode 287 is connected to the base terminal of transistor 290. Transistor 290 is provided to make voltage signal Vb a constant current. The conversion rate of transistor 290 is determined by resistors 291, 292 and 293. The converted signal, in the form of a stabilizing signal Vf, is supplied to a feedback terminal (F/B).

The operation of the FIG. 5 embodiment is as follows. Variable shunt regulator 247 adjusts the level of the reference voltage Vref so as to retain the level of the divided voltage Vout 2. As a result, excitation voltage V21 which is supplied to primary winding n21 is adjusted, so that corresponding stabilizing signal Vf is supplied to switching control means 40. Since the stabilizing signal Vf is made a constant current, high speed response is realized.

Fourth and Fifth Illustrative Embodiments

In these embodiments, the stabilizing signal Vf is obtained by comparing the output voltage Vout with the reference voltage Vref at the primary winding n21.

FIG. 6 depicts an embodiment which differs from the circuit of FIG. 2 in that excitation energy supplying means 22 and stabilizing signal supplying means 24 are replaced. Supplying means 22 comprises resistors 224 and 226 for dividing switching signal Vs1 and a transistor 228 to the base of which the divided voltage is inputted as a control signal. The collector germinal of transistor 228 is connected to primary winding n21, and the emitter terminal is grounded. Transistor 228 is turned ON and OFF by means of the base voltage. These terminals are used as a switching element, and may be replaced by other devices which perform a similar function, such as an FET or a diode.

Means 24 comprises resistor 232 and 233 for dividing the output voltage Vout and for supplying the divided voltage Vout 4 to an arithmetic amplifier 235. Amplifier 235 compares the reference voltage Vref generated by constant-voltage regulated power supply 234 with divided voltage Vout 4, and supplies an error signal $\epsilon$ which has been amplified at a predetermined rate, to primary winding n21. These components act as an error amplifier, and also as a variable power supply which activates an error signal $\epsilon$. In this case, the voltage at one terminal of primary winding n21 is expressed by Vd, and the voltage generated in secondary winding n22 is expressed as Ve.

The operation of the FIG. 6 embodiment will now be described with reference to FIGS. 7(A)–7(C) which depict waveforms at the output voltage stabilizing portion 20 shown in FIG. 6, and wherein FIG. 7(A) depicts the waveform of switching signal Vs1, FIG. 7(B) depicts the waveform of voltage signal Vd, and FIG. 7(C) depicts the waveform of voltage signal Ve. In response to switching signal Vs1, transistor 28 is activated so that a voltage signal Vd having a complementary waveform as that of switching signal Vs1 is generated in primary winding n21. Voltage signal Vd has an amplitude which corresponds to error signal $\epsilon$ representing the distance between the reference voltage Vref and divided voltage Vout 4. Then, as a result of the activation of transformer 26, voltage signal Ve is generated in secondary winding n22, and is rectified and smoothed by means 28, and is supplied to control means 40 as stabilizing signal Vf. That is, since stabilizing signal Vf is a voltage which is related to error signal $\epsilon$, it will contribute to the stabilization of output voltage Vout.

In FIG. 8, which depicts a fifth illustrative embodiment, error signal $\epsilon$ is made a current signal. An output signal, as a control signal, from arithmetic amplifier 235, is applied to the base of transistor 236. Output voltage Vout is applied to the emitter of transistor 236 through a current limiting resistor 237. The collector terminal is connected to primary winding n21 so that an output current Id is supplied thereto. These components act as an error signal amplifier and as a variable power supply which activates output current Id.

Figure 9D:

The operation of FIG. 8 will now be described with reference to FIGS. 9(A)–9(E) which depict waveforms at the output voltage stabilizing portion 20 of FIG. 8, and wherein FIG. 9(A) depicts the waveform of switching signal Vs1, FIG. 9(B) depicts the waveform of the voltage signal Vd, FIG. 9(C) depicts the waveform of output current Id, FIG. 9(D) depicts the waveform of the transmission energy, and FIG. 9(E) depicts the waveform of the voltage signal Ve. Output current Id is the current which corresponds to the error signal $\epsilon$ which represents the distance between reference voltage Vref and the divided voltage Vout 4. The waveform of this output current Id gradually rises in accordance with the magnitude of the error signal $\epsilon$, and saturates at a saturated current Id (See FIG. 9 (A)). Therefore, the energy supplied by insulating transformer 26 becomes the hatched area A of FIG. 9(D). This area A is given by the following equation which expresses switching frequency by f and inductance in the primary winding n21 by L.

$$A = L \cdot Id^2 \cdot f/2 \tag{3}$$

In the secondary winding n22, the voltage signal Ve is generated In this case, the error signal $\epsilon$ is supplied by means of a current signal, and operates in a saturated manner insulating transformer 26. Consequently, the inductance can be kept small, and power consumption is reduced.

Sixth Illustrative Embodiment

Figure 10:
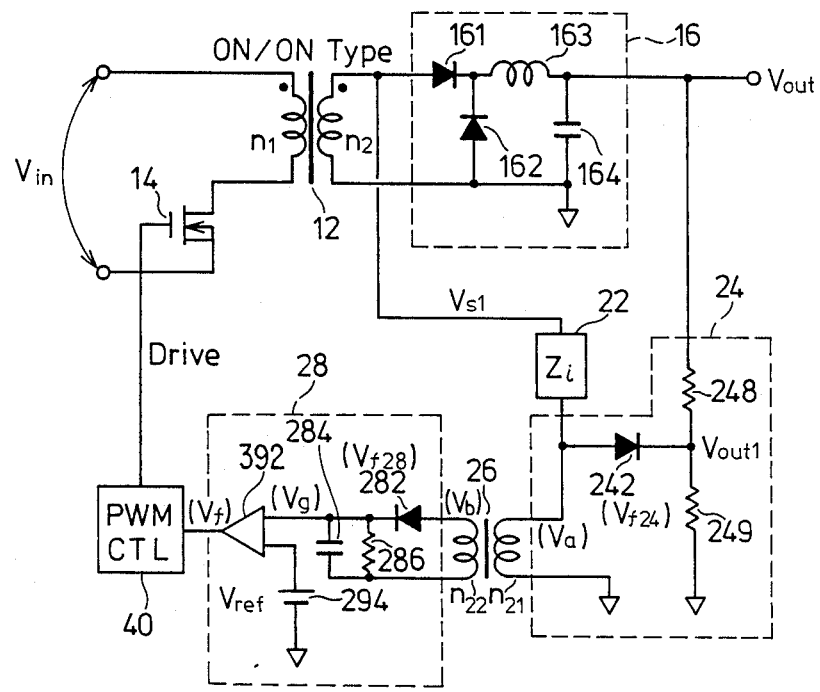
FIG. 10 is a circuit diagram depicting a sixth illustrative embodiment of the invention.

In the embodiment of FIG. 10, the stabilizing signal Vf is obtained by comparing a signal related to the output voltage Vout with the reference voltage Vref at the secondary winding n22. The difference between this embodiment and the others is that in output voltage stabilizing portion 20, a constant voltage regulated power supply 244, which is disposed at the primary winding n21, is moved to the secondary winding n22. In FIG. 10, means 24 is provided with resistors 248 and 249 which divide the output voltage Vout so that divided voltage Vout 1 is supplied to the cathode of diode 242. In means 28, a voltage Vg related to divided voltage Vout 1 which has been rectified and smoothed by diode 282, resistor 286 and capacitor 284. An error amplifier 392 compares related voltage Vg with reference voltage Vref generated by a constant voltage regulated power supply 392 and supplies stabilizing signal Vf to control means 40.

Figure 11A:
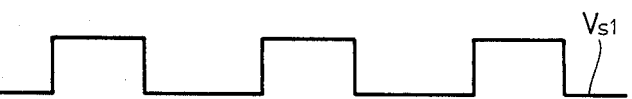
FIGS. 11(A)-11(D) are waveform charts depicting waves of the embodiment of FIG. 10.
Figure 11B:
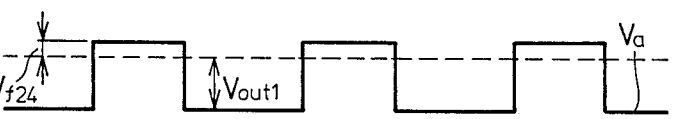
Figure 11C:
Figure 11D:
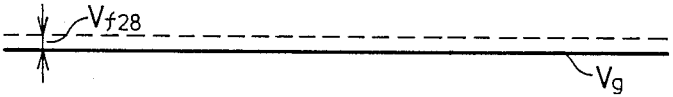

The operation of FIG.10 will not be described with reference to FIGS. 11(A)–11(D) which depict waveforms in the output voltage stabilizing portion 20 of FIG. 20, and wherein FIG. 11(A) depicts the waveform of switching signal Vs1, FIG. 11(B) depicts the waveform of voltage signal Va, FIG. 11(C) depicts the waveform of voltage signal Vb, and FIG. 11(D) depicts the waveform of related voltage Vg. Voltage signal Va represents a voltage which is applied to primary winding n21, and which satisfies the following equation.

$$Va = Vout\ 1 + Vf24 \tag{4}$$

Voltage signal Vb represents a voltage which is activated by secondary winding n22, and becomes related signal Vg after it has been subtracted by the forward bias Vf28 of diode 282. Provided that forward bias Vf24 and Vf28 are the same, the related signal Vg satisfies the following equation.

$$\begin{aligned} Vg &= Vb - Vf28 = Vout\ 1 + Vf24 - Vf28 \\ &= Vout\ 1 = \{R249/(R248 + R249)\}Vout \end{aligned} \tag{5}$$

Thus, related signal Vg becomes completely proportional to output voltage Vout.

Error amplifier 392 amplifies the difference between related signal Vg and reference voltage Vref. Control means 40 conducts control in such a manner that this difference becomes zero so as to stabilize the output voltage Vout.

Figure 12:
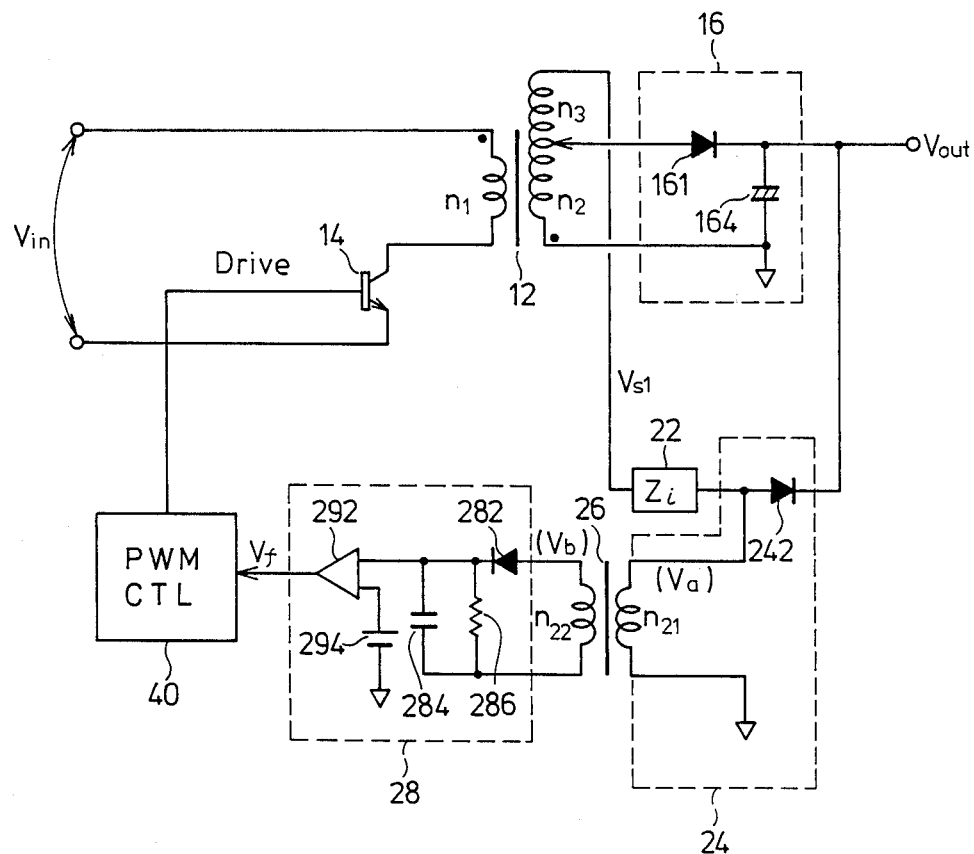
FIG. 12 is a circuit diagram depicting a modification of the embodiment of FIG. 10.

FIG. 12 depicts a modification of the embodiment of FIG. 10 wherein an ON/OFF converter is used for DC power supply 10. A subwinding n3 is provided in series with the secondary winding n2 of main transformer 12, sub-winding n3 being connected to means 22. As a result, the operation of diode 242 is stabilized.

Protection Circuit

Figure 13:
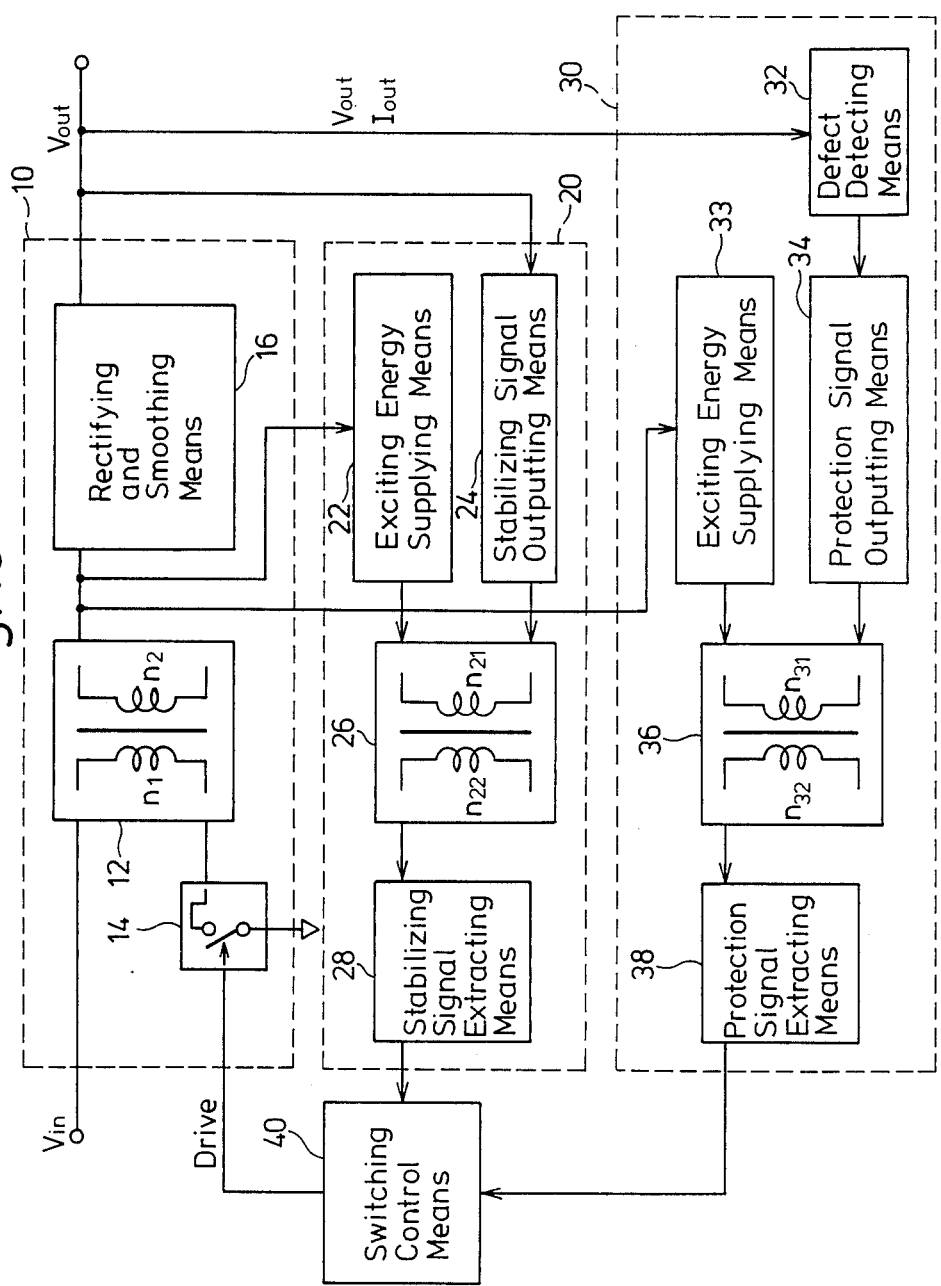
FIG. 13 is a block diagram depicting a device for producing a protection signal to the embodiment of FIG. 1.

FIG. 13 depicts an embodiment which enables concurrent attainment of the first and third objects of the invention, wherein a protection signal supplying means 30 is added to the embodiment of FIG. 1. The protection signal supplying means 30 comprises a defect detecting means 32 for detecting defects, such as overvoltage, overcurrent, and low voltage generated in the load, and excitation energy supplying means 33 which receives as an input the switching signal from secondary winding n2 of main transformer 12 which can be considered as the excitation energy. The supplying means 34 receives, as an input the protection signal outputted by defect detecting means 32. A second insulating transformer 36 receives as an input to a primary winding n31 thereof, the protection signal outputted by supplying means 34, and the excitation energy supplied by supplying means 33. A protection signal extracting means 38 extracts a protection signal Vp from the signals generated in secondary winding n32 of second insulating transformer 36. Switching control means 40 stops the ON/OFF signal to be supplied to switching element 14, the ON/OFF signal being stopped in response to protection signal Vp.

The operation of the FIG. 13 arrangement is as follows. When any defect is generated in the load, protection signal supplying portion 30 supplies protection signal Vp to control means 40. Control means 40 protects the device by stopping supply of power from DC power supply 10.

Seventh Illustrative Embodiment

Figure 14:
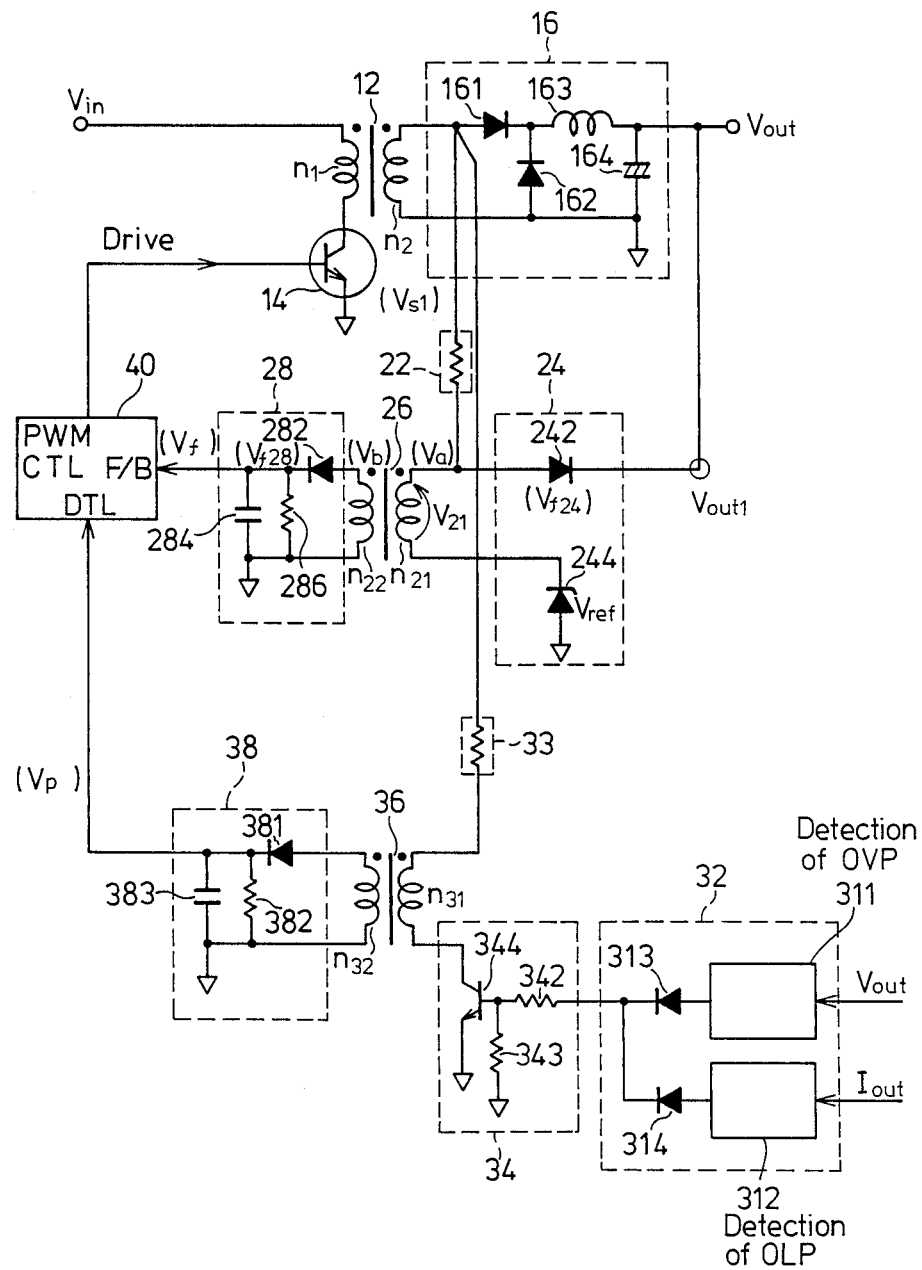
FIG. 14 is a circuit diagram depicting a seventh illustrative embodiment of the invention.

In FIG. 14, which depicts the arrangement of FIG. 13 in specificity, defect detecting means 32 comprises means 311 for detecting an overvoltage by comparing output voltage Vout with predetermined reference voltage Vref 1; means 312 for detecting an overcurrent by comparing output current Iout with reference voltage Vref 2; and means which supplies protection signal Vp when any defect is detected by either one of the defect detecting means 311 or 312. In this embodiment, the case of H is considered to be effected, diodes 313 and 314 are used.

Excitation energy supplying means 33 is a resistor which introduces switching signal Vs1, generated in secondary winding n2 of transformer 12. Excitation energy supplying means 33 is substantially the same as the excitation energy supplying means 22 of FIG. 13.

Protection signal supplying means 34 uses, as a main device, a transistor 344, which is turned ON and OFF by inputting protection signal Vp, supplied from detect detecting means 32, into the base terminal thereof. Resistors 342 and 343 divide the voltage of protection signal Vp to a predetermined level which activates transistor 344. A signal, including information relating to protection signal Vp, is supplied to primary winding n31 of insulating transformer 36.

Excitation energy supplying means 33 is connected to one end of primary winding n31 of insulating transformer 36, while the collector terminal of transistor 344 is connected to the other end of winding n31. The emitter terminal of transistor 344 is grounded.

Protection signal extracting means comprises a diode 381 for rectifying the voltage signal generated in secondary winding n32 of insulating transformer 36, a capacitor 383 which accumulates and smooths the smoothed signal, and a resistor 382 for determining the time constant of capacitor 383. The signal outputted by capacitor 383 is supplied to control means 40 in the form of a protection signal Vp.

The protection signal supplying means 30 operates as follows. When defect detecting means 32 detects a defect, the level of the base voltage of transistor 344 becomes H, so that the transistor switch is turned ON. As a result, excitation energy is supplied to insulating transformer 36 through excitation energy supplying means 33, so that protection signal Vp becomes H.

Control means 40 recognizes the change of signal Vp from L to H, and undertakes countermeasures. First, an operation power supply terminal Vcc is supplied with a signal. When signal Vp becomes H, the supply is shut down and an automatic return does not occur. Second, a feedback signal input terminal F/B is supplied with the signal. In this state, output voltage Vout of control means 40 seemingly increases, as a result of which, output voltage Vout from DC power supply 10 decreases. In this case, automatic return occurs.

Eighth Illustrative Embodiment

Figure 15:
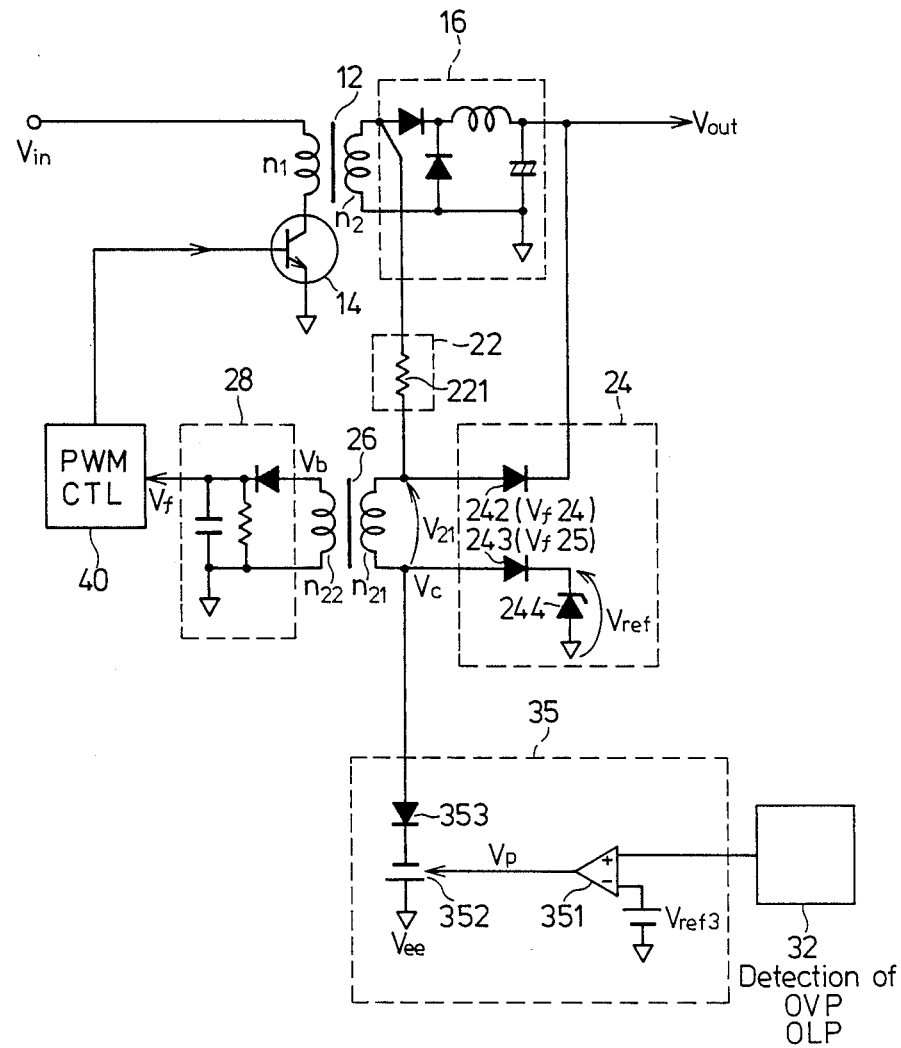
FIG. 15 is a circuit diagram depicting a modification of the embodiment of FIG. 14, and an eighth illustrative embodiment.

The embodiment depicted in FIG. 15 differs from the FIG. 14 embodiment in that insulating transformers 26 and 36 are combined in a single transformer so that reduction of cost is achieved. Since an insulating transformer which satisfies standard safety requirements must have sufficient space, which requires a large area on a printed circuit, reduction in the number of transformers directly reduces costs. In addition, a diode 243 is provided between primary winding n21 and constant voltage regulated power supply 244, wherein the potential at the anode of diode 243 is represented by Vc. Detecting means 35 informs primary winding n21 of the fact that protection signal Vp is being supplied. A comparator 351 compares reference voltage Vref 3 with the signal detected by defect detecting means 32 and in response generates an effective or ineffective protection signal Vp. A negative power supply 352 controls a negative voltage Vee in response to signal Vp from comparator 351. Negative power supply 352 increases the absolute value of negative voltage Vee when protection signal Vp is effective, while the absolute value Vee is decreased when protection signal Vp is ineffective. The anode of diode 353 is connected to primary winding n21, while at the cathode of diode 353 is connected to negative power supply 352 so as to prevent switching signal Vs1,.generated across secondary winding n2, and constant voltage regulated power supply 244 from being affected by negative power supply 353.

The operation of the FIG. 15 embodiment is as follows. When signal Vp is ineffective, no voltage is supplied from negative power supply 352. Thus, excitation voltage v21 is given by the following equation.

$$V21 = Va - Vc = Vout + Vf24 - Vf25 - Vref \quad (6)$$

When signal Vp is effective, negative voltage Vee is supplied from negative power supply 352. Thus, excitation voltage V21 is given by the following equation.

$$V21 = Va - Vc = Vout + Vf24 - Vf25 - Vref + Vee \quad (7)$$

As a result, the potential of stabilizing signal Vf, in which information related to protection signal Vp is accumulated, is increased so that control means 40, in response to signal Vp, narrows the pulse width of the drive signal to be supplied to switching element 14. Thus, output voltage Vout of DC power supply 10 is decreased and protection from any damage is achieved.

By arranging forward bias Vf28 of diode 28 (see FIG. 14 for designation) to be the same as forward bias (Vf24-Vf25) of diodes 242 and 243, and considering the winding ratio of insulating transformer, a stabilizing signal Vf is obtained at output voltage Vout without affecting the diode 282.

Defect Detecting Means

Figure 16:
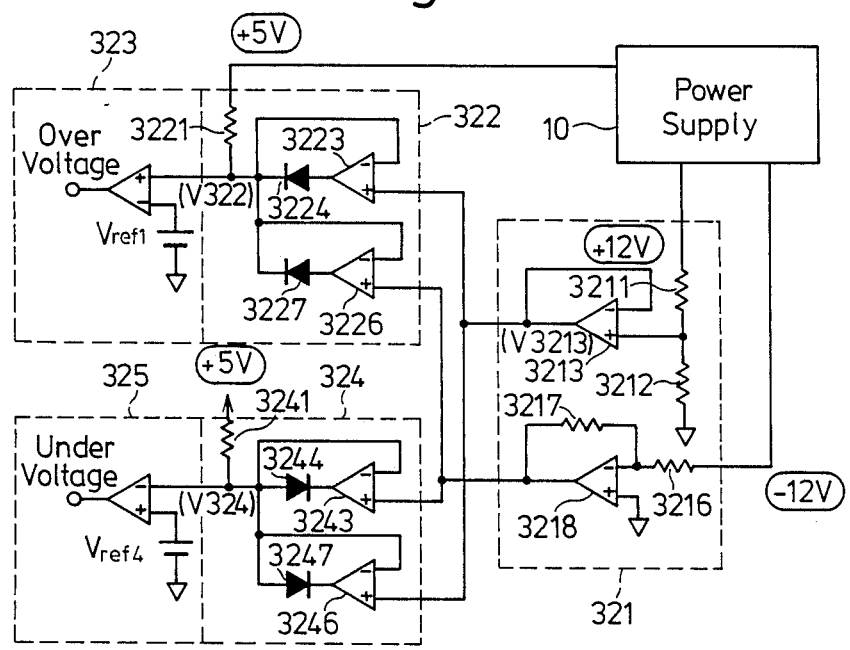
FIGS. 16 and 17 are circuit diagrams depicting means for detecting defects.

Turning to FIG. 16, an example of the circuit used in defect detecting means 32 is depicted, wherein the case of both high level potential and low level potential being detected is discussed with the DC power supply being an multioutput power supply. Power supply 10 comprises positive and negative output power supplies +5 v, +12 v, and −12v.

A level converter 321 supplies +5 v per se to a voltage follower 3213, and supplies +12 v to follower 3213 after dividing the voltage using resistors 3211 and 3212, and supplies −12 v to inversion amplifier 3218 by using resistors 3126 and 3217, with −12 v being fit into +5 v by linear conversion.

A high voltage selection circuit 322 selects the maximum signal from signals outputted from the level converter 321. In this case, resistor 3221, which is provided to limit current, is connected to +5 v terminal of supply 10, a diode 3224 is connected to the output terminal of voltage follower 3223 of +12 v, and a diode 3227 is connected to a voltage follower 3226 of −12 v. The above components are commonly connected to obtain maximum voltage. The cathode terminals of diodes 3224 and 3227 are arranged toward the commonly connected side to obtain maximum voltage.

A high voltage comparison circuit 323, comprising a comparator (not numbered) receives as an input a voltage V322, which has been outputted from high voltage selection circuit 322, and compares voltage V322 with reference voltage Vref 1. In order to prevent occurrence of hunting, a hysteresis resistor is preferably connected to this comparator. When the input voltage V322 becomes higher than the reference voltages Vref 1, an output signal, acting as a protection signal, is made to be H.

A low voltage selection circuit 324 selects the signal of the lowest level from the signal outputted by level conversion portion 321. In this case, a resistor 3241, which limits current, is connected to the +5 v lead from supply 10, diode 3244 is connected to the output terminal of voltage follower 3243 of +12 v, and a diode 3247 is connected to the output terminal of voltage follower 3246 of −12 v. The above parts are commonly connected to obtain maximum voltage. The anode terminals of diodes 3244 and 3247 are arranged to face the commonly connected side to obtain the minimum voltage.

A low potential comparison circuit 325, comprising a comparator (not numbered) receives as input the voltage V324 which was outputted by low potential selection circuit 324 to compare voltage V324 with reference voltage Vref 4. A hysteresis resistor may be connected to this comparator to prevent occurrence of hunting. When input voltage V324 becomes lower than reference voltage Vref 4, the output signal, acting as a protection signal, is made to be H.

Operation of the FIG. 16 arrangement is as follows with reference to the case where a defect of low voltage is detected. Divider resistors 3211 and 3212 give the output terminal voltage V3213 of voltage follower 3213 by the following equation.

$$V3213 = \{R3212/(R3211 + R3212)\} \times (12 \text{ volts}) \quad (8)$$

For example, consider the case where +12 v drops to +10 v. In this case, output voltage V3 of voltage follower U1 becomes substantially +4 v. Then, when the other voltages are normal, low voltage selection circuit 325 selects an output voltage V3213 as the output voltage V324. If the reference voltage Vref 4 is, for example, 4.5 volts low potential comparison circuit 325 makes the protection signal H. In a high potential case, a similar operation is performed.

Figure 17:
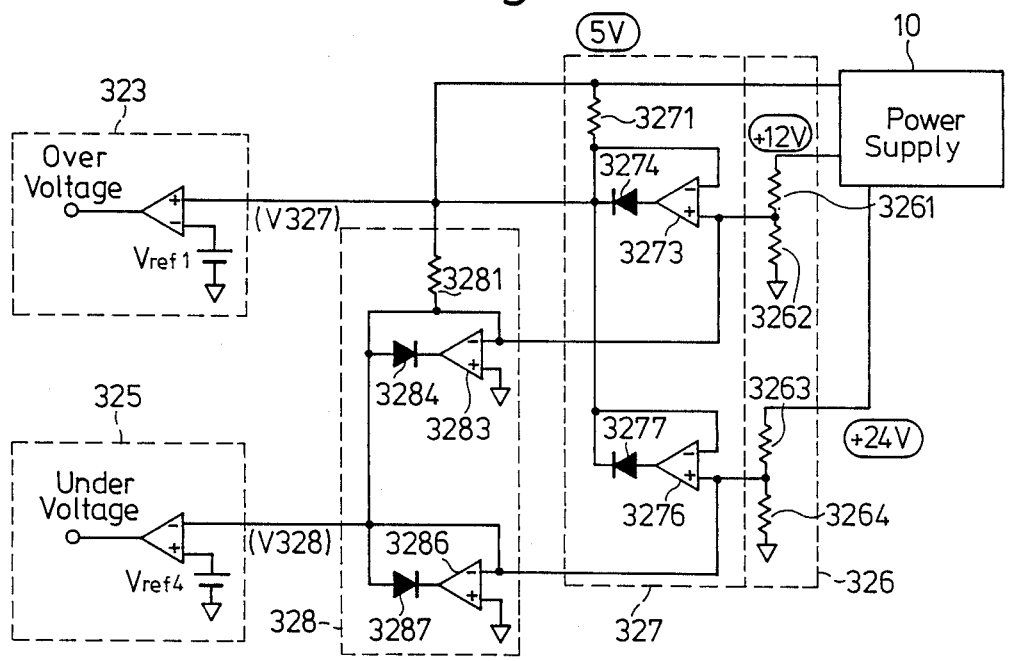

FIG. 17 depicts another circuit for use as the detecting means 32. This embodiment is preferred for use in detecting low potential or high potential with respect to a positive only power supply. In this case, the positive voltage is arranged to be 5, 12 and 26 volts. The level converter 326 treats +5 volts as is, divides +12 volts by means of resistors 3261 and 3262, and divides +26 volts by means of resistors 3263 and 3264. The divided voltages are fit into +5 volts by linear conversion.

High voltage selection circuit 327 selects the signal of the maximum level from the signals outputted by level converter 326. In this case, resistor 3271, which is provided to limit current, is connected to +5 volts; a diode 3274 is connected to the output terminal of voltage follower 3273 of +12 volts; and a diode 3277 is connected to the output terminal of voltage follower 3276 of +26 volts. These components are commonly connected to obtain maximum voltage.

Low voltage selection circuit 328 selects the signal of the lowest level from signals outputted from level converter 326. In this case, a resistor 3281, which is provided for limiting current, is connected to +5 volts; a diode 3284 is connected to the output terminal of voltage follower 3283 of +12 volts; and a diode 3287 is connected to the output terminal of voltage follower 3286 of +26 volts. These components are commonly connected to obtain maximum voltage.

The manner of connecting the diodes 3274, 3277, 3284 and 3287 is the same as that for diodes 3224, 3227, 3244 and 3247. Compared to FIG. 16, the structure of the level converter in FIG. 17 is simplified, and the voltage follower and inverse amplifier may be deleted.

Although the power supply is described as having three outputs, the invention is not so limited. For example, four or more outputs may be used if the level is unified by level converter 321. Further, in order to obtain protection from overcurrent, the described treatment may be similarly conducted by converting the signal to voltage.

The foregoing description is illustrative of the principles of the invention. Numerous modifications and extensions thereof would be apparent to the worker skilled in the art. All such modifications and extensions are to be considered to be within the spirit and scope of the invention.

What is claimed is:

1. A forward type DC power supply comprising a main transformer comprising a first primary winding and a first secondary winding and to which a direct current is inputted to said first primary winding, a switching element for turning ON and OFF said direct current into said first primary winding, and a rectifying and smoothing circuit for rectifying and smoothing a switching signal generated in said first secondary winding and supplying said switching signal to a load said DC power supply further comprising said rectifying and smoothing circuit comprising a first diode having an anode connected to one end of said first secondary winding, a second diode having an anode connected to the other end of said first secondary winding, a choke winding having one end thereof connected to a cathode of said first and second diodes, and a capacitor having one terminal thereof connected to the other end of said choke winding and another terminal thereof connected to the other end of said first secondary winding so that forward conversion is obtained and full cycle switching signal is supplied to said load;

excitation energy supplying means for producing an excitation energy;

means directly connecting said first secondary winding to said excitation energy supplying means for supplying said switching signal from said first secondary winding to said excitation energy supplying means;

stabilizing signal supplying means comprising voltage reference means and connected to said rectifying and smoothing circuit for generating a stabilizing signal which relates to an output voltage from said rectifying and smoothing circuit;

first insulating transformer comprising a second primary winding and a second secondary winding which generates signals in said second secondary winding;

means for supplying said stabilizing signal from said stabilizing signal supplying means to said second primary winding;

means for supplying said excitation energy from said excitation energy supplying means to said second primary winding;

stabilizing signal extracting means connected to said first insulating transformer for extracting a stabilizing signal from said signals generated in said second secondary winding; and switching control means connected to said stabilizing signal extracting means for stabilizing an output voltage by adjusting an ON/OFF control signal to be supplied to said switching element in response to said stabilizing signal extracted by said stabilizing signal extracting means.

2. The power supply of claim 1, wherein said excitation energy supplying means comprises an impedance device comprising one end connected to another anode of said first diode to receive said switching signal of said first secondary winding.

3. The power supply of claim 1, wherein said excitation energy supplying means comprises an impedance device connected to said cathode or anode of said first diode to receive said switching signal from said first second winding.

4. The power supply of claim 1, wherein said excitation energy supplying means comprises a subwinding and an impedance device connected in series with said first secondary winding to obtain said switching signal through said subwinding.

5. The power supply of claim 1, wherein said excitation energy supplying means comprises a switching element comprising a transistor comprising a base terminal, a collector terminal and an emitter terminal, and means for connecting said first secondary winding to said base terminal, means for connecting either of said collector terminal or said emitter terminal to ground, and means for connecting the other of said collector terminal or said emitter terminal to one end of said second primary winding.

6. The power supply of claim 1, wherein said excitation energy supplying means comprises an impedance device and wherein said stabilizing signal supplying means comprises a diode comprising a cathode connected to receive a signal related to said output voltage and an anode connected to said impedance device and to one end of said second primary winding.

7. The power supply of claim 6, wherein said stabilizing signal supplying means comprises a constant voltage regulated power supply connected to another end of said second primary winding, so that the difference between a signal inputted through said diode and a reference voltage of said constant voltage regulated power supply is generated in said second primary winding.

8. The converter of claim 1, wherein said stabilizing signal supplying means comprising an error amplifier comprising a terminal for receiving a signal related to said output voltage, and wherein said error amplifier compares said signal related to said output voltage with a predetermined reference voltage and generates an error signal to output said error signal to the other end of said second primary winding.

9. The power supply of claim 1, wherein said stabilizing signal extracting means comprises
a circuit for rectifying, smoothing and extracting said excitation energy from a signal related to output voltage generated in said secondary winding; and
an error signal simplifier for comparing said output signal from said rectifying and smoothing circuit with a predetermined reference voltage to output an error signal of a level containing effective information as said stabilizing signal.

10. The power supply of claim 1, wherein said stabilizing signal extracting means comprises a rectifying and smoothing circuit for rectifying and smoothing a signal generated in said second secondary winding so as to extract level components of of a signal from said excitation energy.

11. The power supplies of claim 10, wherein said stabilizing signal supplying means comprises
a first diode comprising an anode, and a cathode, said cathode being connected to obtain a signal related to said output voltage and said anode being connected to an impedance device and one end of said second primary winding; and wherein
said rectifying and smoothing circuit of said stabilizing signal extracting means comprises a first diode and means for cancelling the forward voltage of said first diode, said forward voltage of said first diode being generated in said second secondary winding.

12. A DC/DC converter comprising a DC power supply comprising a main transformer having a first primary winding and a first secondary winding and to which a DC current is inputted to said first primary winding, a switching element which turns ON and OFF said DC in said first primary winding, and a rectifying and smoothing circuit which rectifies and smooths a switching signal generated in said first secondary winding, and which supplies said switching signal to a load; said DC/DC converter further comprising
an impedance device comprising one end connected to obtain a switching signal in said first secondary winding;
stabilizing signal supplying means comprising a first diode comprising a first cathode and a first anode, said first cathode being connected to obtain a signal related to output voltage, and said first anode being connected to the other end of said impedance device and to one end of a second primary winding of an insulating transformer, and a second diode comprising a second anode and a second cathode, said second anode being connected to the other end of said second primary winding, and said second cathode being connected to a constant voltage regulated power supply;
said insulating transformer comprising said second primary winding and a second secondary winding, and means for inputting a stabilizing signal outputted from said stabilizing signal supplying means to said second primary winding;
stabilizing signal extracting means which rectifies and smooths a signal generated in said second secondary winding to extract a stabilizing signal;
means for detecting defects in a load;
protection signal supplying means comprising a third diode comprising a third anode and a third cathode, a control terminal, and means for inputting a protection signal outputted by said defect detecting means to said control terminal, and when said protection signal is effective, a negative power supply is connected to said third cathode, and said third anode being connected to the other end of said second primary winding; and
switching control means which adjusts, in response to said stabilizing signal, an ON/OFF control signal to be supplied to said switching element to stabilize said output voltage, and which stops supply of said ON/OFF control signal in response to said protection signal which is supplied so that the protection signal overlaps said stabilizing signal.

13. A DC/DC converter comprising a DC power supply comprising a main transformer comprising a first primary winding and a first secondary winding and to which a DC is inputted to said first primary winding; a switching element which turns ON and OFF said DC in said first primary winding; and a rectifying and smoothing circuit which rectifies and smooths a switching signal generated in said first secondary winding so as to supply said switching signal to a load; said DC/DC converter further comprising
a first excitation energy supplying means, for inputting said switching signal as an excitation energy from said first secondary winding;
a stabilizing signal supplying means for generating a stabilizing signal related to an output voltage of said rectifying and smoothing circuit;
a first insulating transformer comprising a second primary winding and a second secondary winding and to which said stabilizing signal outputted by said stabilizing signal supplying means is inputted to said second primary winding, and which supplies said stabilizing signal from excitation energy supplied by said first excitation energy supplying means;
stabilizing signal extracting means for extracting a stabilizing signal from signals generated in said second secondary winding;
means for detecting defects in a load;
second excitation energy supplying means for inputting said switching signal from said first secondary winding as excitation energy;
protection signal supplying means for receiving a protection signal outputted by said defect detecting means;
a second insulating transformer comprising a third primary winding, and a third secondary winding and to which said protection signal outputted by said protection signal supplying means is inputted to said third primary winding, and which supplies said protection signal from excitation energy supplied by said second excitation energy supplying means;

a protection signal extracting means for extracting a protection signal from signals generated in said third secondary winding; and switching control means which adjusts, in response to said stabilizing signal, an ON/OFF control signal to be supplied to said switching element to stabilize said output voltage, and which stops, in response to said protection signal, supply of said ON/OFF control signal.

14. The converter of claim 13, wherein said stabilizing signal supplying means comprises a first diode comprising an anode, and a cathode, said cathode being connected to obtain a signal related to said output voltage and said anode being connected to said impedance device and one end of said second primary winding; and wherein said rectifying and smoothing circuit of said stabilizing signal extracting means comprises a first diode and means for cancelling the forward voltage of said first diode, said forward voltage of said first diode being generated in said second secondary winding.

15. The converter of claim 13, wherein said second excitation energy supplying means comprises an impedance device having two ends, one end being connected to receive said switching signal from said first secondary winding, and another end being connected to one end of said third primary winding.

16. The converter of claim 13, wherein said protection signal extracting means comprises a rectifying and smoothing circuit for rectifying and smoothing said signal generated in said third secondary winding to extract a protection signal from said excitation energy.

17. The converter of claim 13, wherein said defect detecting means comprises a level converter which unifies various output voltages to a predetermined level when said output voltages of said DC power supply are normal;

a selection circuit which extracts a signal of the maximum or minimum magnitude from signals whose levels have been unified by said level converter; and a comparison circuit which compares a signal selected by said, selection circuit, and which outputs a protection signal when the maximum value is selected and selected value is higher than a reference voltage, and when the minimum value is selected and the selected value is lower than a reference voltage, a protection signal is outputted.

18. The converter of claim 13, wherein said stabilizing signal supplying means comprises an error amplifier comprising a terminal for receiving a signal related to said output voltage, and wherein said error amplifier compares said signal related to said output voltage with a predetermined reference voltage and generates an error signal to output said error signal to another end of said second primary winding.

19. The converter of claim 18, wherein said error amplifier comprises a variable shunt regulator comprising an anode, a cathode, and a control terminal connected to input a signal related to output voltage, said anode being grounded, said cathode being connected to obtain said output voltage.

* * * * *